(No Model.)

B. C. ROWELL.
DEVICE FOR AUTOMATICALLY OPERATING POWER CAR BRAKES.

No. 444,962. Patented Jan. 20, 1891.

Witnesses
John H. Fox
Jos. L. Belfer

Inventor
Benton. C. Rowell.

THE NORRIS PETERS CO., PHOTO-LITHO., WASHINGTON, D. C.

UNITED STATES PATENT OFFICE.

BENTON C. ROWELL, OF BOSTON, MASSACHUSETTS.

DEVICE FOR AUTOMATICALLY OPERATING POWER CAR-BRAKES.

SPECIFICATION forming part of Letters Patent No. 444,962, dated January 20, 1891.

Application filed May 26, 1890. Serial No. 353,146. (No model.)

*To all whom it may concern:*

Be it known that I, BENTON C. ROWELL, of Boston, in the county of Suffolk and Commonwealth of Massachusetts, have invented certain new and useful Improvements in Devices for Automatically Operating Power Car-Brakes, of which the following is a specification.

This invention relates to improvements upon certain devices described and shown in the specification and drawings accompanying my application filed January 24, 1890, Serial No. 337,933; and it consists in the application of springs beneath the two levers which form the cam-plate or inclined surface, by which the devices for opening the air or steam valve are operated, so as to keep the said cam-plate normally in its highest or operative position, and in attaching one end of a chain or wire rope to the said cam-levers at their contiguous ends and the other end of the chain to a lever or to the periphery of a wheel secured upon a shaft having bearings on a support beside the rail, and upon which shaft are diametrically-projecting arms, to which a rope is attached, or a grooved pulley, around which is passed the said rope leading to a switch, draw-bridge, or signal-target. The benefit of this improved construction is that whenever a switch or draw-bridge is opened the cam-plate to operate the valve of the power-brake automatically assumes the requisite position for the purpose, and also if the rope leading from the shaft beneath the cam-plate to the switch or draw-bridge should break or any other parts connected therewith should become disarranged so as to fail to operate properly, the cam-plate will, by the action of the springs beneath it, remain in its operative position ready to open the brake-valve of a passing train, and thus, although a railway-train might be stopped when there was no threatening danger, the chances of disastrous accident will be greatly reduced.

Figure 1:
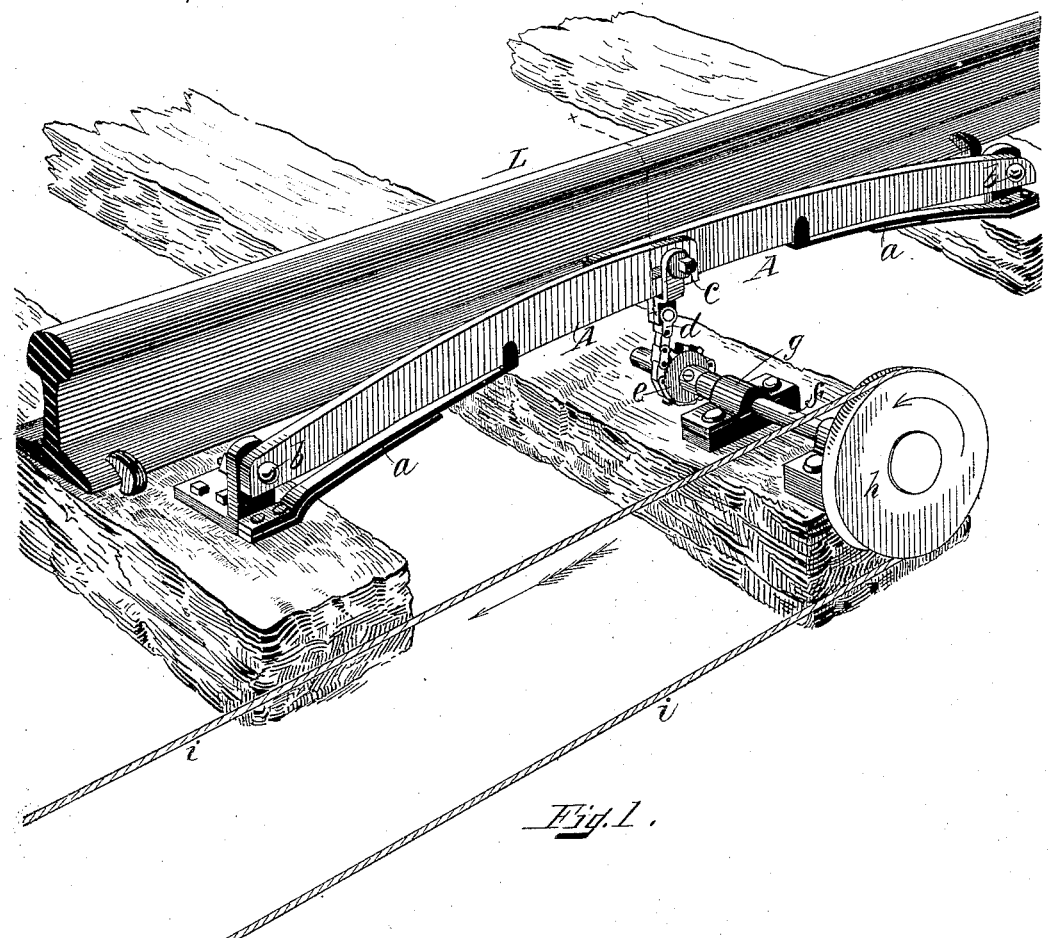
Figure 2:
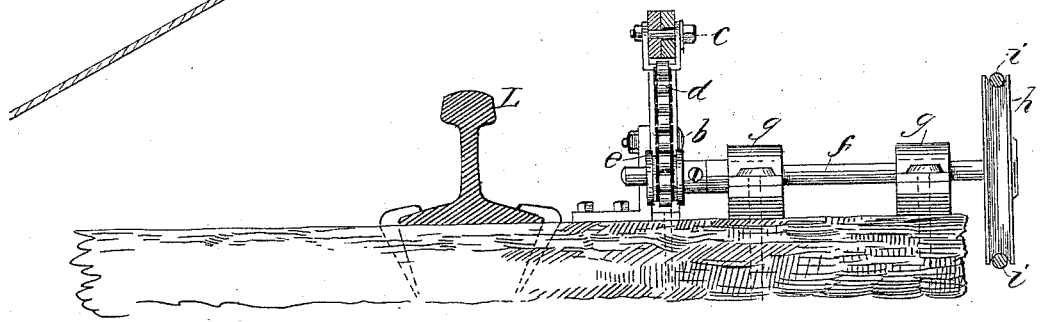

In the drawings forming a part of this specification, Figure 1 is a perspective view of my improved cam-plate or inclined levers and the springs and other devices by which it is operated. Fig. 2 is a sectional view of the rail and the cam-levers at their contiguous ends upon line *x x*, Fig. 1.

Referring to the drawings, A A are the two levers which constitute the cam-plate; *a a*, the springs which hold said levers normally in the elevated operative position shown; *b b*, the pivots upon which the said levers turn; *c*, the bolt which holds the contiguous ends of the said levers together; *d*, a chain attached at one end to the bolt *c* and at the other to the periphery of a sprocket-wheel *e*, and by means of which the levers A are pulled down out of their operative position and against the action of the springs *a*.

*f* is a shaft upon which the sprocket-wheel *e* and also a grooved pulley *h* are made fast, and *g* the bearings for said shaft.

*i* is the rope or chain which connects the grooved pulley with the draw-bridge, switch, or danger-signal. L is the rail beside which the cam-plate is arranged.

Any other form of spring than that illustrated may be used provided it has sufficient power to hold the levers A A in their operative position and force the device for opening the valve of the power-brake upward enough to open that valve.

It is obvious that there are many locations along a railroad where but one of said cam-levers will be needed; but in that event it should be held up in its operative position by a spring, as illustrated, and connected with the switch or draw-bridge, so as to be pulled down only when the switch or draw is closed. Also, substantially the same operation will be effected if a segment of a pulley or arms corresponding to the spokes of a wheel are used instead of the complete pulley and wheel *h* and *e*.

I claim—

1. In combination with a railway-switch, draw-bridge, or danger-signal, one or more pivoted levers beside the rail, a spring beneath each lever to hold it normally in an operative position with relation to the brake-valve-operating devices of a passing train, and a rod or chain connecting each of said levers with a crank or wheel operated by mechanism connected with the switch or draw-bridge to withdraw the levers from said operative position, substantially as described.

2. The combination of one or more levers pivoted beside the rail of a railway-track, a spring to hold each lever normally in a raised position, and a flexible connection between the said levers and a wheel beneath upon a shaft connected with a switch or draw-bridge, whereby said levers will be raised by the spring to a position to operate the brake-valve of a passing train when the switch or draw-bridge is open and will be lowered by the action of the interconnecting mechanism when the switch or draw-bridge is closed, substantially as described.

BENTON C. ROWELL.

Witnesses:
JOS. L. BELFLER,
CHAS. R. YOUNG.